Aug. 29, 1961 W. A. MOAKLER 2,998,551
FREQUENCY-RESPONSIVE RELAY SYSTEM
Filed July 24, 1958 2 Sheets-Sheet 1
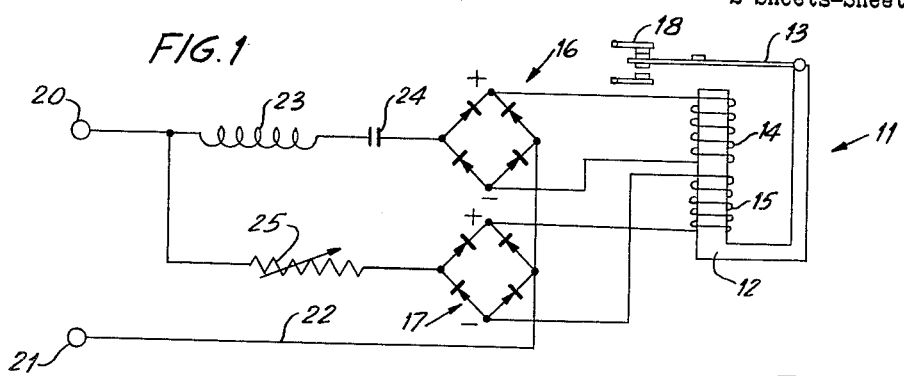
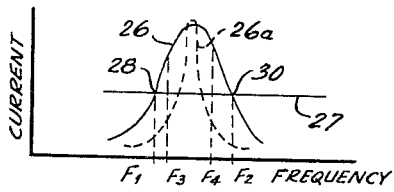
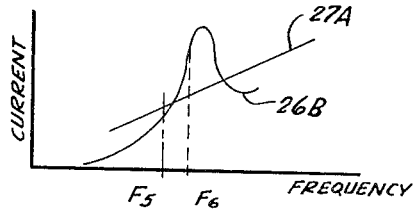
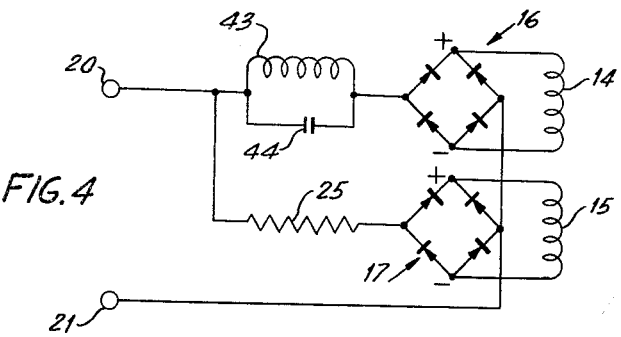
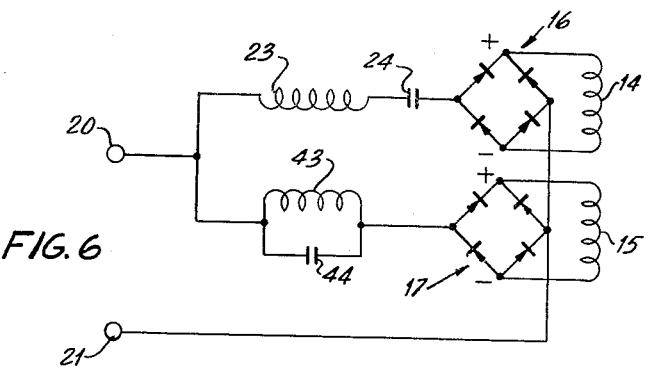
INVENTOR:
WILLIAM A. MOAKLER
BY Frederick Breitenfeld
ATTORNEY

United States Patent Office 2,998,551
Patented Aug. 29, 1961

2,998,551
FREQUENCY-RESPONSIVE RELAY SYSTEM
William A. Moakler, Bergenfield, N.J., assignor to Automatic Switch Co., Florham, N.J., a corporation of New York
Filed July 24, 1958, Ser. No. 750,781
4 Claims. (Cl. 317—147)

This invention relates generally to alternating current control systems, and has particular reference to frequency-sensitive relays.

It is a general object of the invention to provide an improved and simplified electrical relay which is responsive to changes in frequency but substantially unresponsive to changes in voltage.

A control system employing a relay having these characteristics has many uses. For example, it may be employed to initiate transfer of a load from one generator to another when the frequency of the generator to which the load is connected becomes unstable; or to prevent the connection of equipment to a power line except when the frequency is within a predetermined normal range; or to disconnect such equipment from the line if the frequency increases or decreases beyond allowable limits. It is desirable in situations of this nature that the relay be immune to fluctuations in voltage.

For these and analogous purposes, ordinary alternating current relays are unsuitable, since the current flow that controls their operation varies in direct proportion to the voltage and in inverse proportion to the frequency, hence such a relay will respond to changes in frequency if the voltage is held constant, but will be unresponsive to a condition in which the frequency and voltage vary concurrently in the same direction.

For many reasons it is necessary or desirable, in alternating current power systems, to restrict the application of power to a relatively narrow frequency range. For example, alternating current motors are generally designed for a small range of frequencies, and beyond this range excessive speeds are encountered which may be injurious to the driven mechanisms. Also, when such a motor receives an alternating current at a frequency less than normal, abnormally large currents must be supplied to the motor to maintain it in operation.

It is among the objects of this invention to provide a relay system which will be useful in applications of the kind mentioned, and which is simple in structural nature, small in size, inexpensive to manufacture, and dependable in operation.

Other objectives are to provide a frequency-responsive relay which obviates many of the disadvantages and limitations of devices heretofore proposed for the purpose, and which is independent of complications arising from phase angle or power factor characteristics of the applied alternating current.

The improved relay system of this invention is of particular utility when installed in a power system which employs an alternator having a rotating member, and the invention will therefore be illustrated and described from that standpoint. However it will be understood that the invention is not necessarily restricted to any such field of use.

Briefly stated, the invention comprises a relay having two electromagnetic windings, each connected to its own rectifier circuit. One of the rectifier circuits is connected to an alternating current power system in series with a first frequency responsive circuit. The other rectifier is connected to the same power system in series with another frequency responsive circuit in which the frequency response differs from that of the first circuit. The two windings on the relay are connected in opposition so that if the currents through the windings are equal, no magnetic flux will be developed in the relay core.

Several ways of achieving the objects and advantages of the invention are illustrated in the accompanying drawings, in which—

FIG. 1 is a schematic diagram of connections showing one embodiment of the improved relay system;

FIG. 2 is a graph showing the variation of currents applied to the relay windings when the frequency is varied;

FIG. 3 is a graph similar to FIG. 2 but showing the currents applied to the relay windings when the alternating current power is derived from an alternator employing a rotary member;

FIG. 4 is a schematic diagram of connections similar to FIG. 1 but showing a modification;

FIG. 5 is a graph similar to FIG. 2, showing the variation of currents applied to the relay coils when connected to the circuit shown in FIG. 4;

FIG. 6 is a schematic diagram of a further modification, employing two resonant circuits;

FIG. 7 is a graph showing the variation of currents in the circuit shown in FIG. 6;

Figure 8:
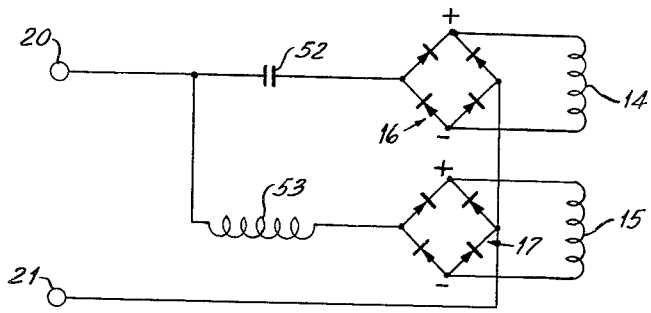
FIG. 8 is a schematic diagram of connections of another modification of the system.

Referring first to FIG. 1, a relay 11 comprises a main core 12 and an armature 13. The core 12 supports two windings 14 and 15, these windings being connected respectively to rectifier circuits 16 and 17. Armature 13 is adapted to control a plurality of contacts 18 which may be either normally open or normally closed in accordance with the requirements of the control to be exercised. Rectifiers 16 and 17 are shown in FIG. 1 as comprising four rectifier elements to form what is commonly known as a rectifier bridge. Other rectifier circuits may be used, however, the bridge circuit being shown only for convenience.

The alternating current power is applied to two input terminals 20 and 21, terminal 21 being connected to conductor 22 which is connected to both bridge circuits 16 and 17, thereby forming a common conductor which may be grounded if desired. Terminal 20 is connected to a series resonant circuit which includes an inductor 23 and a capacitor 24, these two elements being chosen so as to produce resonance at the desired frequency. Terminal 20 is also connected to a resistor 25 which in turn is connected to rectifier 17.

The characteristics of series resonant circuits are well-known and are shown in the graph in FIG. 2 where curve 26 represents the variation of current through the resonant circuit, plotted against frequency. By varying the resistance in inductor 23 and by a choice of values of inductance and capacitance, the response curve 26 may be altered. For example, it may be caused to be a sharper, more pointed curve as indicated by the dotted line 26A, more sharply responsive to a selected frequency.

The alternating current flowing from terminal 20 through resistor 25, rectifier bridge 17, and conductor 22, to the second terminal 21 has a different frequency response, i.e., the circuit shown develops a current value which is practically invariant with frequency, this characteristic being indicated in FIG. 2 by a horizontal line 27.

It will be evident that at point 28 represented by a first frequency $F_1$ the currents through windings 14 and 15 are equal and thus produce no magnetic flux and no relay action. Also, at the point 30 corresponding to frequency $F_2$, the two currents again have equal values and produce zero flux in the relay core, this condition obviously causing no relay action and retaining the relay contacts in their normal position.

If the frequency is now changed from $F_1$ to some higher value $F_3$, the current delivered to winding 15 remains the same but the current delivered to winding 14 is considerably greater and results in an excess of current in this winding over the current in winding 15, thereby producing flux which (when it reaches a predetermined value) actuates the relay armature. In a similar manner if the frequency of the applied wave is changed from $F_2$ to some lower value $F_4$, the current in winding 14 is again increased to a value which produces magnetic flux and relay actuation. Any applied power having a frequency which lies within a selected range, e.g., within the range between $F_3$ and $F_4$, causes actuation of the relay armature 13.

This circuit satisfies the requirements of an over and under frequency relay which is unaffected by phase angle differences and by voltage variations, since increases and decreases in voltage affect both coil currents in the same way.

The diagram of connections shown in FIG. 4 is the same as that shown in FIG. 2 except that a parallel resonant circuit comprising an inductor 43 and a capacitor 44 is used instead of the series resonant circuit shown in FIG. 2. By a suitable selection of resistance value for resistor 25, the two currents applied to windings 14 and 15 of relay 11 may be caused to vary along the lines indicated by the graph shown in FIG. 5. The currents in the two coils 14 and 15 are obviously equal at points 45 and 46. Between these two points (which are representative of two frequencies $F_7$ and $F_8$) winding 14 receives considerably less current than winding 15 and within a range of frequency values between the two above-mentioned points the difference between the two currents is sufficiently great to actuate the relay.

FIG. 3 is a graph similar to that of FIG. 2, showing what happens when the applied power originates from a generator having a rotor, whereby the voltage and the frequency increase and decrease together. The current in each winding 14, 15 is zero at zero frequency, and as the applied voltage increases (as the rotor gathers speed) the currents vary as shown, the variation in the non-resonant circuit being along the straight line 27A while the variation in the resonant circuit (line 26B) involves a peak at the resonant frequency.

The relay circuit shown in FIG. 6 is a combination of the circuits shown in FIGS. 1 and 4, having a series resonant circuit 23, 24, and a parallel resonant circuit 43, 44, both connected to rectifiers and each producing a characteristic frequency curve similar to that shown in FIGS. 2 and 5. The combination of these two circuits produces current variations as shown in FIG. 7 where, as before, there are two points 50 and 51 at which the currents are equal and where at the resonant frequency $F_9$ the current through winding 14 is at its maximum and the current through winding 15 is at its minimum. This arrangement produces larger effective changes in the relay coil currents than the circuits of FIGS. 1 and 4. The operation of this circuit is the same as that previously described, except that the relay is stronger for the same differential, or a closer differential may be attained with the same relay strength.

Figure 9:
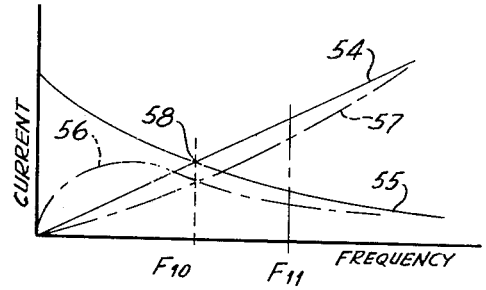
FIG. 9 is a graph showing current variations in the relay windings when connected to the circuit shown in FIG. 8.

A further modification of the circuit is shown in FIG. 8 where the circuit of the rectifier 16 and winding 14 includes a single capacitor 52 in series, and the circuit of the rectifier 17 and winding 15 includes a single inductor 53 in series. The variation of currents with changes in frequency is shown in FIG. 9. If the applied power stems from a source of constant voltage and varying frequency, the current through the capacitor circuit and coil 14 is indicated by line 54, and the current through the inductor circuit and winding 15 is indicated by the curve 55 (the current at zero frequency being a finite value determined by the resistance of the inductor). If this relay system is connected to a power line from an alternator whose voltage varies with its frequency, the current-frequency characteristics are as indicated by dotted lines 56 and 57, for the reasons pointed out in connection with FIG. 3.

It will be obvious from FIG. 9 that the currents through windings 14 and 15 are equal at point 58 corresponding to a predetermined frequency $F_{10}$ and that the relay armature 13 is unactuated at this frequency. At all other frequencies the current through one of the windings is greater than the current through the other winding and flux is produced which may be employed to operate armature 13. In practice, this relay performs to advantage when it is employed in a generator circuit to "drop out" at or near frequency $F_{10}$ and to remain activated at or beyond a normal frequency $F_{11}$. This it will do, since the curves 54 and 55 continue to diverge at frequencies higher than the "drop-out" frequency. Since the divergence of the current curves is not so great in the region to the left of the line $F_{10}$, activation of the relay at frequencies below $F_{10}$ can be readily prevented by establishing an appropriate minimum flux requirement for relay operation.

Figure 10:
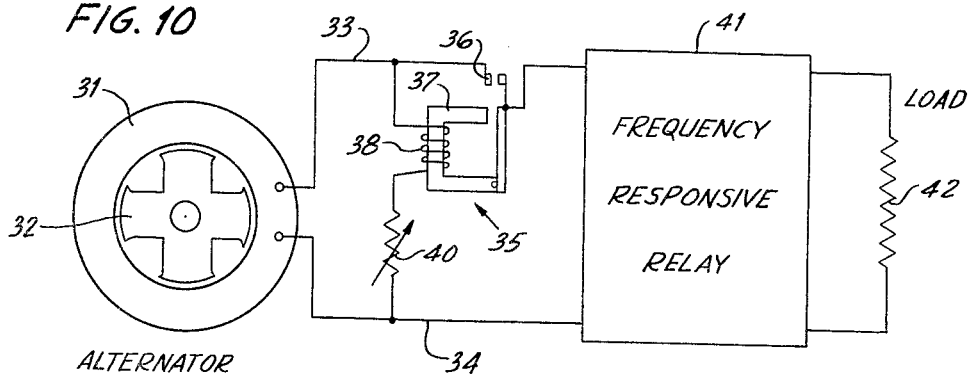
FIG. 10 is a schematic diagram of connections showing how the frequency responsive relay may be connected in a power system which includes an alternator, a load, and a voltage-sensitive relay.

Alternatively, a voltage-responsive relay may be employed along with the frequency-responsive relay, as indicated in FIG. 10, to disconnect the frequency relay when the voltage and frequency are below the desired operating range. In FIG. 10, an alternator 31 includes a rotating field member 32 and produces a voltage and frequency on power conductors 33 and 34 which are each proportional to the rotating speed. A voltage-sensitive circuit breaker 35 with contacts 36 is placed in series with conductor 33. Circuit breaker 35 also includes a core 37 and a winding 38 which is connected across the power lines 33 and 34 in series with a variable resistor 40 for accurate voltage adjustment.

The frequency responsive relay 41 is connected in the circuit between circuit breaker 35 and a load 42. The relay 41 may have the components and connections as shown in any of the circuits hereinbefore described, and may possess the corresponding current-frequency characteristics as indicated by the graph shown. By way of example, if it be assumed that the current variations are those depicted in FIG. 3, then when the alternator 31—32 is first started, the low speed of the rotor 32 produces a low frequency and low voltage, this power being cut off by open contacts 36. As the speed is increased, both the voltage and frequency increase until, at frequency $F_5$ (FIG. 3) the voltage is sufficient to operate the circuit breaker 35 and close contacts 36. The power from the alternator is still not applied to load 42 because relay 41 is unactuated. However, when the frequency is increased to a value indicated by $F_6$ on the graph, the relay 41 is actuated and power is applied to the load 42. The same operation takes place in reverse if the generator fails and slows down.

While there have been described and illustrated several specific embodiments of the present invention, it will be obvious that various changes and modifications in details can be made without necessarily departing from the field of the invention which should be limited only by the scope of the appended claims.

What is claimed is:

1. A frequency-responsive relay system comprising: a pair of input terminals for connection to a source of alternating current power which may vary in frequency; a resonant circuit connected in series between the input terminals and a first rectifier; a second circuit connected in series between the input terminals and a second rectifier, said second circuit being so constructed that at two different frequencies the current through said second circuit is equal to the current through said resonant circuit but at all frequencies between said two different frequencies the current through said second circuit is unequal to the current through said resonant circuit; and a relay having a non-polarized armature and a core having a single magnetic flux path; two windings on said core each of which is connected to one of said rectifiers so as to receive rectified current therefrom, said windings being arranged so as to produce magnetomotive forces in the core which are in opposition to each other, whereby when the frequency being applied to said relay is within the range between said two different frequencies the current in one of said windings will exceed the current in the other and said armature will be attracted to said core, and when the frequency being applied approaches either of said two different frequencies the currents in said windings will be equal and said armature will not be so attracted.

2. A frequency responsive relay system as set forth in claim 1 wherein said second circuit is also a resonant circuit, one of said resonant circuits including a capacitor and an inductor in series and the other of said circuits including a capacitor and an inductor in parallel.

3. A frequency responsive relay system as set forth in claim 1 wherein said resonant circuit includes a capacitor and an inductor in series and said second circuit consists solely of a resistor.

4. A frequency responsive relay system as set forth in claim 1 wherein said resonant circuit includes a capacitor and an inductor in parallel and said second circuit consists solely of a resistor.

References Cited in the file of this patent

UNITED STATES PATENTS

| | | |
|---|---|---|
| 1,758,540 | Shaw | May 13, 1930 |
| 1,925,954 | Bellescize | Sept. 5, 1933 |
| 2,500,939 | Exner | Mar. 21, 1950 |
| 2,537,998 | Henquet | Jan. 16, 1951 |
| 2,540,022 | Rabenda | Jan. 30, 1951 |
| 2,729,771 | Hadfield | Jan. 3, 1956 |
| 2,768,291 | Lutomirski | Oct. 23, 1956 |

FOREIGN PATENTS

| | | |
|---|---|---|
| 662,881 | Germany | July 23, 1938 |
| 233,004 | Switzerland | Sept. 16, 1944 |
| 623,970 | Great Britain | May 25, 1949 |